United States Patent

[11] 3,545,797

| [72] | Inventor | Allan J. Korecky<br>Cleveland, Ohio |
|---|---|---|
| [21] | Appl. No. | 754,609 |
| [22] | Filed | Aug. 22, 1968 |
| [45] | Patented | Dec. 8, 1970 |
| [73] | Assignee | Barmatic Machines, Inc.<br>Cleveland, Ohio<br>a corporation of Ohio |

[54] BALL JOINT WITH PLASTIC SEAT
4 Claims, 8 Drawing Figs.

[52] U.S. Cl.......................................................... 287/87
[51] Int. Cl......................................................... F16c 11/06
[50] Field of Search............................................ 287/87, 90(A), 90(C)

[56] References Cited
UNITED STATES PATENTS

| 2,124,034 | 7/1938 | Hufferd ....................... | 287/90(C)UX |
| 2,845,290 | 7/1958 | Latzen........................... | 287/90(A)UX |
| 2,999,708 | 9/1961 | Dudash ......................... | 287/87 |
| 2,999,710 | 9/1961 | Latzen........................... | 287/90(A)UX |
| 3,063,744 | 11/1962 | Flumerfelt.................... | 287/87 |
| 3,089,718 | 5/1963 | Gottschald ................... | 287/90(A)UX |
| 3,210,105 | 10/1965 | Vogt.............................. | 287/87 |
| 3,233,929 | 2/1966 | Herbenar ..................... | 287/87 |
| 3,342,513 | 9/1967 | Melton et al.................. | 287/90(A)UX |

FOREIGN PATENTS

| 1,183,807 | 2/1959 | France .......................... | 287/90(C)UX |
| 878,147 | 9/1961 | Great Britain................ | 287/90(C)UX |

*Primary Examiner*—David J. Williamowsky
*Assistant Examiner*—Andrew V. Kundrat
*Attorney*—Baldwin, Egan, Walling & Fetzer ABSTRACT: A ball joint assembly includes a socket having an open end and a substantially hemispherical recess in which is seated the generally hemispherical head of a stud mounted for rotational and pivotal movement relative to the socket. A synthetic resin seat is provided between the stud head and the socket. This seat has a generally hemispherical portion snugly fitting the head of the stud and a generally cylindrical skirt portion extending generally tangentially away from the hemispherical portion before the parts are assembled. The seat has an annular bead extending radially outwardly from the seat where the hemispherical portion joins the skirt portion. When the parts are assembled, the head of the stud is placed inside the hemispherical portion of the seat which in turn is fitted into the hemispherical recess in the socket. The shank of the stud extends out the open end of the socket. An annular seat retaining ring of generally segmental spherical shape embraces the skirt portion of the seat around the outwardly extending shank of the stud and this ring is tightly pressed against the seat holding it firmly against the spherical head and compressing the skirt inwardly against the head and held in place by peening over the socket member around the upper edge of the retaining ring. Preferably, the retaining ring has an outwardly flared upper edge which fits snugly against the bead of the seat.

PATENTED DEC 8 1970

INVENTOR
ALLAN J. KORECKY
BY
Baldwin, Egan, Walling & Fetzer
ATTORNEYS

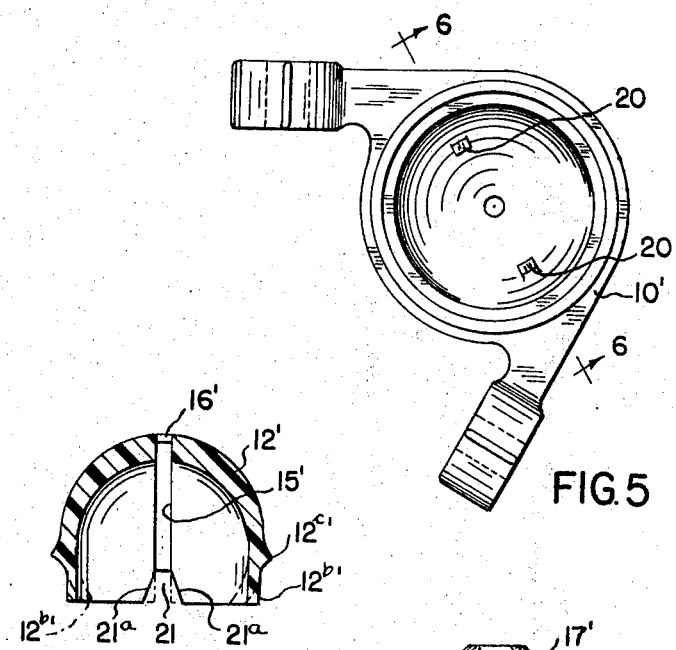
FIG.5
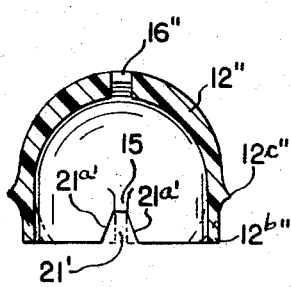
FIG.7
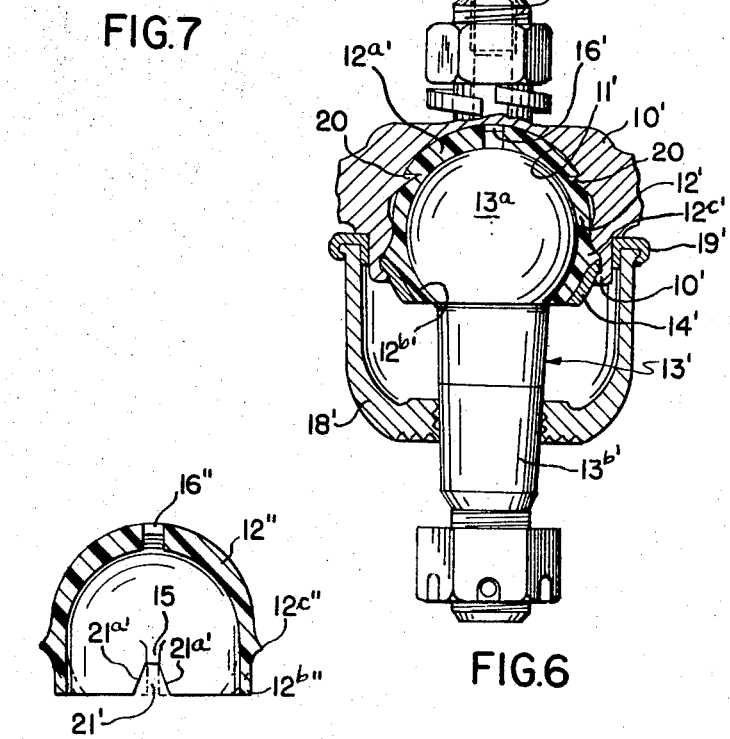
FIG.6
FIG.8
INVENTOR
ALLAN J. KORECKY
BY
Baldwin, Egan, Walling & Fetzer
ATTORNEYS

BALL JOINT WITH PLASTIC SEAT

An object of the present invention is to provide a ball and socket joint with a resilient seat between the interfitting ball and socket members, such seat being so designed that it is easy to mold with no undercut parts to hinder withdrawal of the male portion of the die when the seat is molded. The invention includes a simple metal retaining ring which holds the outer skirt portion of the seat tightly against the spherical head of the stud in the socket and this ring is rigidly secured to the socket member so that the ball will be held in the socket even in case of failure of the plastic seat.

Two embodiments of the invention are shown in the accompanying drawings and the essential features will be set forth in the appended claims.

In the drawings:

FIG. 5 is a bottom plan view of the socket member of a second embodiment of this invention;

FIG. 6 is a central sectional view of the second embodiment taken along the line 6–6 of FIG. 5;

FIG. 7 is a central sectional view of the resilient plastic seat of FIG. 6; while FIG. 8 is a central sectional view of a resilient plastic seat which is a modification of FIG. 7.

The first embodiment of the invention shown here includes a socket member 10 which can be of any desired form to which it is desired to connect the ball head of the stud involved in this invention. The socket has a generally hemispherical recess 11 into which is seated the upper or generally hemispherical portion 12a of a resilient seat 12.

Figure 3:
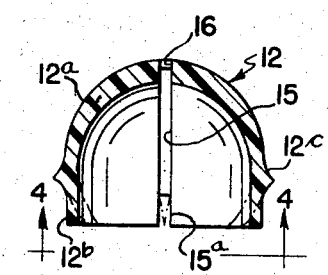
FIGS. 3 and 4 are respectively a central sectional view and a bottom plan view of the resilient plastic seat in its molded and unstressed form.

The seat 12 is molded preferably out of synthetic resin material, high density polyethylene being preferred. As shown in FIG. 3 in full lines, the seat 12 lends itself easily to the molding operation. The hemispherical portion 12a merges smoothly at its open side into a generally cylindrical skirt portion 12b having an inside diameter approximately equal to the inside diameter of the hemispherical portion and having a length approximately not more than one-third of the inside diameter of the hemispherical portion. As shown here, it is somewhat less than one-third of such diameter. A continuous annular bead 12c is molded integral with the seat and extends radially outward from the seat approximately where the hemispherical portions joins the skirt portion. As seen in full lines in FIG. 3, the seat is easy to mold because it has no undercut portions which would hinder the withdrawal of the male plug forming a part of the mold to form the hollow interior thereof. The skirt portion 12b as shown in full lines in FIG. 3 is later pushed inwardly to the dot-dash position when the parts are assembled as will be presently described.

Figure 4:
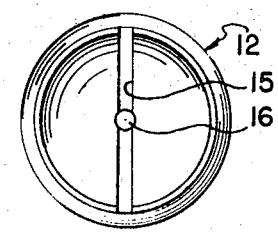

After the seat of FIGS. 3 and 4 is assembled in the hemispherical recess 11 of the socket member, the stud 13 is placed in position. This stud has a generally spherical head 13a and an integral shank 13b extending away from the head through the open end of the socket member. A seat retaining ring 14 is then slipped along the shank 13b to the position shown in FIG. 2 and pressed tightly against the skirt portion 12b of the seat pressing it snugly against the spherical ball 13a. This retaining ring is of generally segmental spherical shape flared outwardly at its upper end of larger diameter 14a in a manner to fit snugly against the curved underside of the bead 12c. At this time the skirt portion 12b of the seat is moved radially inwardly and flattened somewhat to the full line position of FIG. 2 or the dot-dash position of FIG. 3. The retaining ring 14 is then rigidly secured to the socket member, here shown as a peening over of the lower portion 10a of the socket member upon the retaining ring. It will be noted in FIG. 3 that the skirt portion 12b is somewhat thinner than the hemispherical portion 12a so as to aid in the final assembly in the position shown in FIG. 2. It will also be noted that the polar region of the resilient seat is somewhat thicker than other portions and the reason for this is that that is the area where greatest pressure occurs.

Preferably, means is provided for lubrication of the mating surfaces between seat 12 and the ball head 13a. As clearly seen in FIGS. 3 and 4, a generally semicircular groove 15 is provided on the inner surface of the seat 12 passing diametrically through the polar region of the hemispherical portion and completely splitting the free end of the skirt portion 12b as indicated at 15a. A through opening 16 is provided through the seat at the polar region communicating with the groove 15. Opposite this point a stud 17 extends outwardly from the socket member and is provided with a central opening 17a leading through the stud 17 and the socket member 10 to communicate with the opening 16 in the seat. A standard lubricating fitting a can then be attached to the upper end of the stud 17 to supply lubricant through openings 17a and 17 and to the groove 15.

Referring to FIG. 3, when the skirt 12b is clamped in position by the retaining ring 14 as shown in dot-dash lines in FIG. 3, the slit portions 15a, diametrically opposite each close as shown in dot-dash lines in FIG. 3 sufficiently to keep out water and dirt but making it possible to relieve grease pressure in the groove 15 which can be relieved outwardly through the clamped skirt.

Figure 1:
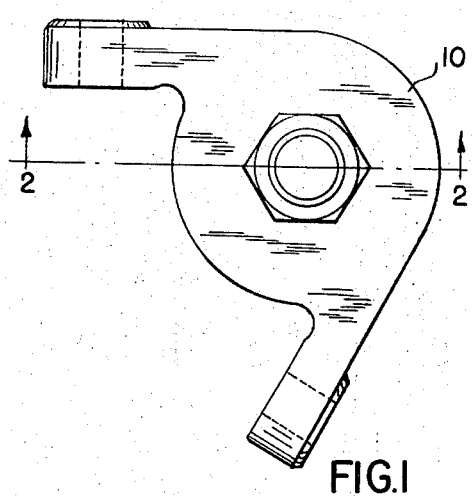
FIG. 1 is a top plan view of a first embodiment of the invention shown in FIG. 2.
Figure 2:
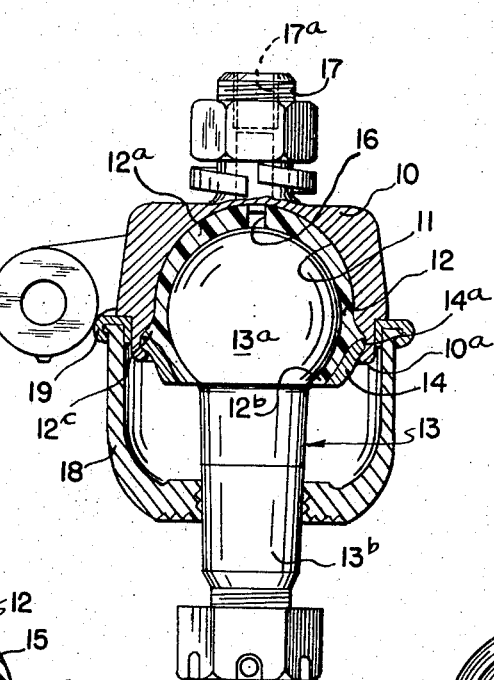
FIG. 2 is a central sectional view of the same taken along the line 2–2 of FIG. 1.

If desired, a dust cover 18 maybe applied to the finished assembly as shown in FIG. 2 held in position by a retaining ring 19 firmly fixed on the socket member 10.

I have thus provided a simple ball and socket assembly with a resilient seat between the ball and socket members, said seat being easily molded because of it its shape and held in position by the retaining ring 14 which also acts as a safety member against disassembly of the joint in case of plastic failure. The bead 12c on the resilient seat prevents rotation of the seat relative to the socket about an axis at right angles to the longitudinal axis of the stud. At the same time, the lubrication system is simple but effective.

FIGS. 5, 6 and 7 show a second embodiment of this invention which in many respects is similar to the first embodiment. Parts like those described in the first embodiment have been given the same reference numeral with a prime suffix. These are the socket member 10' with its lower portion 10a' peened over on the seat retaining ring 14'. The socket member has a hemispherical recess 11' receiving the generally hemispherical synthetic resin seat 12' having a hemispherical portion 12a', a cylindrical skirt portion 12b' and an annular bead 12c'. 13' is a stud having a generally spherical head 13a' and a shank 13b'. 16' is an oil and air opening through the polar region of the seat 12, 17' is an oil stud connection, while 18' is a dust cover secured by a retaining ring 19'.

One difference in the second embodiment is that it is provided with interengaging means between the seat 12' and the socket 11' preventing rotation of the seat relative to the socket about the longitudinal axis of the stud 13'. The means here shown comprises two upset projections 20 providing sharp edges extending inwardly from the recess 11', two such projections being shown in FIGS. 5 and 6. When the ball joint is assembled, these projections 20 bite into the plastic material of the seat 12' so as to prevent relative rotation between the seat and the socket member about the longitudinal axis of the stud 13'. This provides a longer and more efficient operation of the ball joint assembly.

Another variation of the second embodiment is illustrated in FIG. 7. Here the generally semicircular groove 15' for lubrication purposes is quite similar to the groove 15 described in the first embodiment. The difference occurs where the extension of this groove cuts through the skirt portion 12b' of the seat member wherein the sides of slit 21 at diametrically opposite sides of the seat diverge toward the open end of the seat as indicated at 21a. This makes it easier to conform the skirt portion tightly against the stud head 13a' when the ball joint is assembled, at which time the skirt portion takes the dot-dash position shown in FIG. 7.

FIG. 8 shows another modification of the seat member indicated there as 12''. Here the oil and air opening 16'' is is provided at the polar region and the annular bead 12c'' is as before. A very short groove is shown at 15'' terminating in slits 21' which extend entirely through the skirt portion 12b'' at diametrically opposite sides of the seat member. Here again, the sides of the slits diverge toward the open end of the seat member as indicated at 21a'.

I claim:

1. A ball joint assembly comprising a socket having an open end, a stud mounted for rotational and pivotal movement relative to said socket and having a generally spherical head positioned in said socket and a shank integral with said head and extending away from said head and freely through said open end, a hollow resilient seat between said socket and said head, said seat being of a synthetic resin material and consisting of a hollow generally hemispherical portion fitting snugly between said socket and that portion of said stud head opposite said shank, said hemispherical portion merging smoothly at its open side into a skirt portion which in unstressed condition is generally cylindrical having an inside diameter approximately equal to the inside diameter of said hemispherical portion and having a length approximately not more than one-third of the inside diameter of said hemispherical portion, and a continuous annular bead integral with said seat and extending radially outwardly therefrom where said hemispherical portion joins said skirt portion, there being a groove on the inner surface of said seat passing diametrically through the polar region of said hemispherical portion and splitting the free end of said skirt portion at diametrically opposite sides of said seat and permitting the latter to conform to said head adjacent said shank, said splits in said skirt portion in unstressed condition diverging toward the open end of said seat sufficiently so that when said skirt portion is conformed around said head said splits remain open, there being a through opening through said seat at said polar region communicating with said groove for the introduction of lubricant, an annular seat retaining ring having a smaller diameter end surrounding and spaced from said shank where the latter joins said head, said ring inclined away from the axis of said shank toward a larger diameter end adjacent said head, and means rigidly securing said ring to said socket and pressing said skirt portion tightly conformed against said stud head adjacent said shank.

2. A ball joint assembly as defined in claim 1, wherein said seat has the strength and resiliency of high density polyethylene.

3. A ball joint assembly as defined in claim 1, including interengaging means between said seat and said socket preventing rotation of said seat relative to said socket about an axis at right angles to the longitudinal axis of said stud.

4. A ball joint assembly as defined in claim 1, wherein said means rigidly securing said ring to said socket is a portion of said socket peened over said ring.